Jan. 2, 1962   J. D. REPKO ETAL   3,015,765
VARIABLE CAPACITOR
Filed Feb. 26, 1959

INVENTORS
JAN DIRK REPKO
MARINUS GERARD VERHEIJDEN
BY
AGENT

United States Patent Office 3,015,765
Patented Jan. 2, 1962

3,015,765
VARIABLE CAPACITOR
Jan Dirk Repko and Marinus Gerard Verheijden, Eindhoven, Netherlands, assignors to North American Philips Company, Inc., New York, N.Y., a corporation of Delaware
Filed Feb. 26, 1959, Ser. No. 795,733
Claims priority, application Netherlands Mar. 26, 1958
5 Claims. (Cl. 317—253)

This invention relates to a variable capacitor having electrode plates which are secured to at least one rod or shaft, which is passed through an aperture in each plate, at right angles thereto by means of an axially split sleeve of resilient material which grippingly surrounds the rod and is inserted into the plate apertures. This plate attachment is of particular importance for capacitors having electrode plates made of a metal, such as aluminium, which cannot or can hardly be soldered. Securing is effected by inserting the sleeve into the apertures of the plates which are arranged in a suitable jig, and by driving the shaft through the sleeve with great force.

The external shape of the support rod and of the gripping sleeve and the internal shape of the sleeve and of the plate apertures may be circular or polygonal and the sleeve may have one or more axial slits. The combination of these known possibilities provides a plurality of designs; however, hitherto a useful construction which is suitable for mass production has not been realized.

It is an object of the present invention to provide such a construction. According to the invention, this construction is obtained in that use is made of the combination of a polygonal sleeve, which is bent from sheet material and has only one continuous slit, of a shaft of circular cross-section and of circular plate apertures, the sleeve being provided externally along all its edges with a groove having sharp edges which penetrate into the material of the plate. One of these grooves may be the slit itself.

It should be noted that it is already known to use, for the purpose aimed at, a hexagonal sleeve having three continuous axial slits so that it comprises three separate parts. In this construction it is found that, when the shaft is forced into the sleeve, the sleeve parts tend to shift so as to become located obliquely with respect to the shaft with the result that the plates assume a position not exactly at right angles to the shaft. This disadvantage does not occur with a sleeve having a single slit. Furthermore, it is difficult to insert the tripartite sleeve into the plate apertures without the sleeve disintegrating, and obviously these difficulties do not occur when using a sleeve having a single slit.

Figure 1:
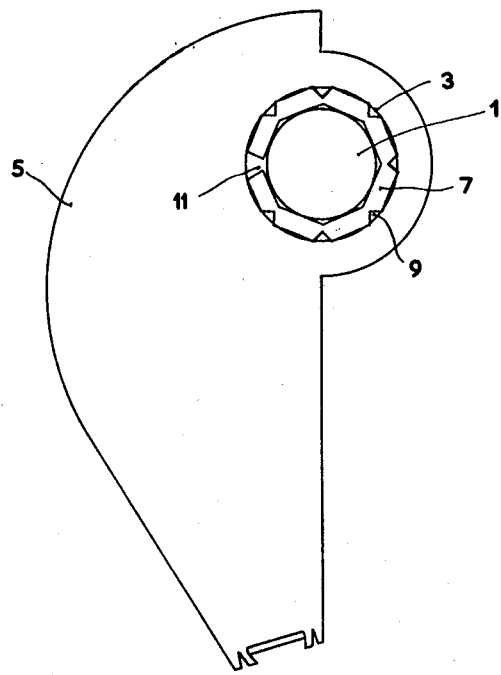
Figure 2:
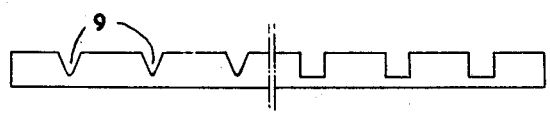

In order that the invention may readily be carried out, it will now be described, by way of example with reference to the accompanying drawings, in which:

FIG. 1 is an axial elevation of the rotor of a variable capacitor, the electrode plates being fastened in a manner in accordance with the invention, and FIG. 2 shows a detail of the means of attachment.

The rotor shown has a preferably steel shaft 1 of circular cross-section to which a number of rotor electrode plates 5 provided with circular apertures 3 are secured so as to extend at right angles thereto by means of an axially split polygonal sleeve 7 made of resilient material, such as brass, and gripping the rod or shaft 1, which it encircles, and the apertures 3, into which it is inserted. The rotor plates 5 may be made of aluminium; in any case, it is of importance that the sleeve material should be harder than the plate material. In the embodiment shown, the sleeve 7 is octagonal and provided with grooves 9 along all its ribs, as is shown in FIG. 1; one of the eight grooves is constituted by a slit 11 which extends from one end of the tube to the other. FIG. 2 shows a metal strip or plate from which the sleeve 7 may be manufactured by bending.

The rotor shown may be mounted by arranging the plates 5 in a jig having matching, exactly parallel arranged grooves, and inserting the sleeve 7 in the plate apertures 3. For this purpose, the sleeve 7 when released may have a diameter slightly smaller than that of the apertures 3. Subsequently the shaft 1 is forced into the sleeve 7. This requires considerable force and the sleeve must be axially supported during this process. When the shaft is forced through the sleeve, the latter expands to an extent such that the sharp edges of the grooves 9 (and 11) penetrate into the material of the plates 5 and produce a clearly visible deformation thereof. The sharp edges of the grooves 9 and 11 now engage the rims of the plate apertures 3 under comparatively great spring pressure so that the plates are satisfactorily fastened to the sleeve, while furthermore the sleeve engages the shaft with sufficient spring pressure to preclude slipping. Owing to the internal and external polygonal shape of the sleeve 7 and the circular cross-sections of the shaft 1 and the apertures 3 it is ensured that, as FIG. 1 shows, the points of contact between the shaft 1 and the sleeve 7 nowhere are exactly opposite the points of contact between the sleeve 7 and the plates 5. That is to say, that the (flat) sides of the sleeve 7 are stretched by bending so that the spring pressure is produced which is required to accomplish the desired resilient fastening of the plates.

In this connection, the provision of the grooves 9 along all the edges of the sleeve 7 is an essential feature. The radial outward forces which the sleeve edges exert upon the plates 5 when the sleeve expands due to the shaft 1 being forced therethrough, are transmitted to these plates through the sharp edges of the grooves 9. The pressure produced at these points is so high that the sharp edges penetrate into the material of the plates. This is not so much of importance for satisfactory attachment as for another reason.

Part of the energy represented by the very considerable outward forces is exhausted in the deformation of the plates when the sharp edges penetrate therein. This prevents a further penetration of the deformation forces into the plates. The deformation by the sharp edges acts effectively as a "safety valve." If the grooves 9 are not provided, the edges of the sleeve bent from the sheet material are obtuse. Thus the forces exerted on the plates 5 by the edges during the expansion of the sleeve 7 are distributed over a much larger area than in the presence of sharp edges. Hence the local pressure is not sufficient to cause the (obtuse) edges to penetrate into the plate material. Consequently the very considerable forces penetrate the plates unweakened and produce stresses which cause warping of the plates after some time.

It should be noted that a rotor plate attachment is known in which use is made of a shaft having sharp longitudinal edges, which is surrounded by an axially slit sleeve of circular cross-section. The plate apertures used are circular also, so that the forces exerted by the expanding sleeve are transmitted undiminished to the plates. Furthermore, a sleeve of circular cross-section is not resilient in a circular aperture.

In principle the sleeve having grooves along its edges might be replaced by a sleeve having sharp edges. However, such a sleeve cannot be made by simple bending of a strip to produce a polygonal sleeve, the sharp edges would have to be obtained by milling the sleeve externally. Such a product is too expensive to be suitable for large-scale manufacture.

The grooves 9 of the sleeve 7 used in FIG. 1 are V-shaped (left hand half of FIG. 2) and can be obtained cheaply by pulling a metal strip under a rotating shaft carrying a number of milling cutters. The grooves may alternatively be rectangular, as is shown in the right hand half of FIG. 2; they may also be trapezoidal or curved. From the metal strip, pieces equal to the required length of the sleeve can be cut off and subsequently bent to a polygon with the aid of a jig.

Preferably, the number of edges of the sleeve 7 is determined empirically, allowance being made for the shaft diameter and the sleeve material. When the number of edges is too small, there are not enough points of contact between the sleeve and the plates, while with an excessive number of edges the sides become too narrow so that the resilience of the sleeve is insufficient. It is found in practice that the best results are achieved with from 7 to 12 edges.

As will be seen from FIG. 1, the slit 11 is located at a point along the circumference of the shaft, at which the plates 5 have a considerable radial dimension ($r$). This is desirable because, when the sleeve 7 expands, the greatest forces occur in the proximity of the slit which widens during the expansion. At these points the plates are sufficiently wide to withstand these forces.

Obviously the stator plates of a variable capacitor may also be secured to support rods in the manner described; generally two rods are used for each bank of stator plates. However, their attachment may be effected in a manner identical to that described with respect to the rotor.

What is claimed is:
1. A variable capacitor having apertured electrode plates secured at right angles to at least one shaft passing through the aligned apertures of each said plate; the improvement comprising a sleeve of polygonal shape constituted of resilient material which is harder than the material of said plates, said sleeve having a single axial slit and being positioned around said shaft in firm engagement with said shaft at points of tangency, and the other side of said sleeve in firm engagement with said electrode plates, said slit being located with respect to the plates at a point at which said plates have a comparatively large radial dimension, said sleeve comprising a pair of sharp edges defined by a longitudinal groove at the apex of the corners defining the outer surface of said polygonal sleeve whereby said sharp edges penetrate into said plates, the portion of said sleeve between said edges comprising a chord of an arc defined by said edges and the aperture of said plates.

2. A variable capacitor as claimed in claim 1 wherein one of said grooves is defined by the free ends of said split sleeve.

3. A variable capacitor as claimed in claim 1 wherein said sleeve has between 7 and 12 corners having groove edges penetrating into the material.

4. A variable capacitor as claimed in claim 1 wherein said sleeve is brass, and said electrode plates are aluminum.

5. A variable capacitor having apertured electrode plates secured at right angles to at least one shaft passing through the aligned apertures of each said plates; the improvement comprising a polygonal shaped sleeve of a material which is harder than the material of said plates, said sleeve having a single axial slit and a pair of axially extending sharp edges at each corner of the sleeve defined by longitudinally extending grooves at the apex of said corners, said sleeve being positioned around said shaft and in firm engagement with said shaft at points of tangency, the other side of said sleeve being pressed against said plates with said sharp edges penetrating said plates, the portion of said sleeve between adjacent pairs of edges comprising a chord of an arc defined by said sleeve and the aperture of said plates.

References Cited in the file of this patent
UNITED STATES PATENTS

| 2,952,483 | Fleckenstein | Sept. 13, 1960 |

FOREIGN PATENTS

| 384,069 | Great Britain | Dec. 1, 1932 |
| 385,508 | Great Britain | Dec. 29, 1932 |
| 1,008,414 | Germany | May 16, 1957 |